US010754452B2

(12) United States Patent
Furtwangler et al.

(10) Patent No.: US 10,754,452 B2
(45) Date of Patent: *Aug. 25, 2020

(54) UNIFIED INPUT AND INVOKE HANDLING

(71) Applicant: Home Box Office, Inc., New York, NY (US)

(72) Inventors: Nathan J. E. Furtwangler, Kirkland, WA (US); Brandon C. Furtwangler, Issaquah, WA (US); J. Jordan C. Parker, Seattle, WA (US)

(73) Assignee: HOME BOX OFFICE, INC., New York, NY (US)

(*) Notice: Subject to any disclaimer, the term of this patent is extended or adjusted under 35 U.S.C. 154(b) by 77 days.

This patent is subject to a terminal disclaimer.

(21) Appl. No.: 16/102,894

(22) Filed: Aug. 14, 2018

(65) Prior Publication Data
US 2018/0356901 A1 Dec. 13, 2018

Related U.S. Application Data

(63) Continuation of application No. 14/843,877, filed on Sep. 2, 2015, now Pat. No. 10,078,382.
(Continued)

(51) Int. Cl.
G06F 3/048 (2013.01)
G06F 3/038 (2013.01)
G06F 3/0482 (2013.01)
G06F 3/0481 (2013.01)
G06F 3/0484 (2013.01)
(Continued)

(52) U.S. Cl.
CPC ............ G06F 3/038 (2013.01); G06F 3/0482 (2013.01); G06F 3/0487 (2013.01); G06F 3/04812 (2013.01); G06F 3/04842 (2013.01); G06F 9/451 (2018.02); G06F 11/3664 (2013.01); G06F 11/3688 (2013.01)

(58) Field of Classification Search
CPC combination set(s) only.
See application file for complete search history.

(56) References Cited

U.S. PATENT DOCUMENTS 5,157,384 A 10/1992 Greanias et al.
5,801,696 A 9/1998 Roberts
(Continued)

OTHER PUBLICATIONS

International Search Report and Written Opinion from International Patent Application Serial No. PCT/US2015/048402 dated Nov. 30, 2015, 11 pages.
(Continued)

Primary Examiner — Hien L Duong
(74) Attorney, Agent, or Firm — Amin, Turocy & Watson, LLP

(57) ABSTRACT

The described technology is directed towards normalizing input received from various types of device types for providing the input to user interface (UI) elements in a unified way that reflects the invoke intent of the user. Input from different device types is classified as button input, pointer input or command input, and routed to a corresponding button provider, pointer provider or command provider. Each provider includes logic for communicating input data (e.g., events) to a UI element or elements. Based upon the input events, a UI element can execute a corresponding invoke handler to take an invoke action for that particular event.

20 Claims, 11 Drawing Sheets

Related U.S. Application Data

(60) Provisional application No. 62/046,132, filed on Sep. 4, 2014, provisional application No. 62/046,122, filed on Sep. 4, 2014.

(51) Int. Cl.
*G06F 9/451* (2018.01)
*G06F 11/36* (2006.01)
*G06F 3/0487* (2013.01)

(56) References Cited

U.S. PATENT DOCUMENTS

| | | | |
|---|---|---|---|
| 5,878,113 A | 3/1999 | Bhusri | |
| 5,880,740 A * | 3/1999 | Halliday | G06T 11/60 345/629 |
| 6,463,581 B1 | 10/2002 | Bacon et al. | |
| 7,451,455 B1 | 11/2008 | El-Haj | |
| 8,051,431 B2 * | 11/2011 | Lee | G06F 3/038 719/318 |
| 8,185,838 B2 | 5/2012 | Bomers | |
| 9,772,889 B2 * | 9/2017 | Lu | G06F 9/542 |
| 2004/0111673 A1 | 6/2004 | Bowman et al. | |
| 2004/0194115 A1 * | 9/2004 | Mogilevsky | G06F 9/451 719/318 |
| 2004/0243349 A1 | 12/2004 | Greifeneder et al. | |
| 2006/0149550 A1 | 7/2006 | Salminen | |
| 2006/0209016 A1 | 9/2006 | Fox et al. | |
| 2007/0130535 A1 | 6/2007 | DeMaio et al. | |
| 2007/0239859 A1 | 10/2007 | Wilkinson et al. | |
| 2007/0288937 A1 | 12/2007 | Durojaiye et al. | |
| 2008/0082991 A1 | 9/2008 | Fairs et al. | |
| 2008/0313607 A1 | 12/2008 | Yutaka et al. | |
| 2009/0254351 A1 | 10/2009 | Shin et al. | |
| 2009/0271514 A1 | 10/2009 | Thomas et al. | |
| 2010/0162212 A1 | 6/2010 | Stall et al. | |
| 2011/0302653 A1 | 12/2011 | Frantz et al. | |
| 2012/0096365 A1 | 4/2012 | Wilkinson et al. | |
| 2012/0255022 A1 | 10/2012 | Ocepek et al. | |
| 2012/0265516 A1 | 10/2012 | Ark et al. | |
| 2013/0067298 A1 | 3/2013 | Li et al. | |
| 2013/0268357 A1 | 10/2013 | Heath | |
| 2013/0326430 A1 * | 12/2013 | Devi | G06F 3/0488 715/863 |
| 2013/0332524 A1 | 12/2013 | Fiala et al. | |
| 2014/0075458 A1 | 3/2014 | Wright et al. | |
| 2014/0195967 A1 * | 7/2014 | Abe | G06F 3/04883 715/798 |
| 2015/0039285 A1 | 2/2015 | Qian | |

OTHER PUBLICATIONS

Non-Final Office Action received for U.S. Appl. No. 14/843,877 dated Aug. 8, 2017, 28 pages.
Ostrand et al., "A Visual Test Development Environment for GUI Systems", Software Engineering Notes, Mar. 1, 1998, ACM, New York, NY, US—ISSN 0163-5948, XP000740949, vol. 23, No. 2, pp. 82-92.
International Search Report and Written Opinion from International Patent Application Serial No. PCT/US2015/048398 dated Nov. 27, 2015, 10 pages.
Non-Final Office Action received for U.S. Appl. No. 14/843,882 dated Dec. 16, 2016, 22 pages.
Final Office Action received for U.S. Appl. No. 14/843,882 dated May 4, 2017, 37 pages.
International Search Report and Written Opinion from International Patent Application Serial No. PCT/US2015/048397 dated Nov. 20, 2015, 9 pages.
Vckovski, Andrej, "wshdbg—A Debugger for CGI Applications," Proceedings of the Sixth Annual Tcl/Tk Workshop, San Diego, California, Sep. 11, 1998, 9 pages.
Mickens, James, "Rivet: Browser-agnostic Remote Debugging for Web Applications," Apr. 11, 2013, 13 pages.
Non-Final Office Action received for U.S. Appl. No. 14/843,893 dated Aug. 29, 2017, 14 pages.
Notice of Allowance received for U.S. Appl. No. 14/843,882 dated Aug. 16, 2017, 37 pages.
International Preliminary Report on Patentability from International Patent Application Serial No. PCT/US2015/048398 dated Mar. 16, 2017, 8 pages.
International Preliminary Report on Patentability from International Patent Application Serial No. PCT/US2015/048397 dated Mar. 16, 2017, 7 pages.
International Preliminary Report on Patentability from International Patent Application Serial No. PCT/US2015/048402 dated Mar. 16, 2017, 9 Pages.
Final Office Action received for U.S. Appl. No. 14/843,877 dated Feb. 7, 2018, 31 pages.
Non-Final Office Action received for U.S. Appl. No. 15/844,781 dated Jan. 24, 2018, 42 pages.
Notice of Allowance received for U.S. Appl. No. 14/843,877 dated May 17, 2018, 36 pages.

\* cited by examiner

UNIFIED INPUT AND INVOKE HANDLING

CROSS-REFERENCE TO RELATED APPLICATION

This application is a continuation of, and claims priority to each of, U.S. patent application Ser. No. 14/843,877, filed on Sep. 2, 2015, entitled "UNIFIED INPUT AND INVOKE HANDLING", and now issued as U.S. Pat. No. 10,078,382, which claims the benefit of U.S. provisional patent application Ser. Nos. 62/046,122 and 62/046,132, filed Sep. 4, 2014. The entireties of the aforementioned applications are hereby incorporated herein by reference.

BACKGROUND

A user interface (UI) of an application program often has hundreds or thousands of elements that when rendered may be combined in complex ways to provide a (hopefully) visually appealing user experience that is also straightforward and consistent to use. These elements are typically arranged as various menus of items from which an item may be selected for navigation (e.g., to another menu) or for taking an action with respect thereto (e.g., play a selected movie, or enter text) and so forth.

In general, a user interacts with a UI element having focus, such as a focused item within a menu, such as to select that item, input text and so on. A user also may interact at a higher level, e.g., at the menu level to change focus to another item, or to scroll items into and out of the menu, or at an even higher level to change focus to another menu's item, and so on.

In contemporary application programs, there are often several ways for a user to interact with the UI, including gamepad input (e.g., pressing the 'A' button on a game controller), keyboard (e.g., QWERTY) input, and media remote input (e.g., pressing a semantic button on a media remote control device, like the "Fast Forward" button). Other typical ways to interact include touch input (e.g., by pressing an on-screen button with a finger, or indirectly with a gesture-detecting/tracking device such as Kinect®), or to interact via mouse or other pointer input (e.g., clicking on a UI element with a mouse). Another interactive technique is voice/speech input, such as saying the word represented by text on a button while in a voice input mode, (e.g., "Play").

The many varied types of input, when considered in combination with the many types of UI elements, can be confusing and time-consuming for a UI designer to handle correctly.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards normalizing different types of device input for consumption by a user interface (UI) element. The normalization attempts to reflect the invoke intent of the user, e.g., as being button input related to button invoke actions, pointer input related to pointer invoke actions, and/or command input related to command invoke actions.

Input from an input device is processed, including selecting a selected provider (e.g., from two or more providers) based at least in part on a type of the input device, and routing the input to the selected provider. Input-related data is communicated from the selected provider to one or more user interface (UI) elements, including providing an input event to a selected UI element. The selected UI element takes an invoke action based upon the input event.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

The technology described herein is directed towards a unified way to handling the "invoke" intent of a user for input directed to a given element of a user interface (UI). For example, a UI element of program code (e.g., an application) such as a button in a menu can be "invoked" to trigger navigation to a new location in the application. However, such a button may be triggered by manual or virtual key input, mouse input, and in other ways, e.g., the invoke intent of a user may be spoken ("Home"). The technology described herein manages the handling of such input in a unified way that reflects the user's intent (to a very high likelihood) with respect to UI element interaction. Note that as used herein, "UI element" may corresponding to any portion of program code with which a user interacts, including but not limited to views, UI object elements such as containers, buttons, tiles, text entry areas, speech input areas, areas for image data, a program window, and so forth.

Thus, the user input that generates an invoke action (e.g., the above described navigation) may be input to the application program code and the application program code's UI in various ways. One aspect described herein is to normalize the different types of input into a lesser number of categories, e.g., three categories comprising Button, Pointer and Command input. Based upon the category of input, a UI element may have an associated invoke action that is taken to accomplish a desired operation.

It should be understood that any of the examples herein are non-limiting. For instance, although certain types of input devices are exemplified herein, the technology is able to work with other types of input devices, including devices that track eye gaze, sense brainwaves, combine device input (e.g., a voice command interpreted one way based upon a concurrent gesture and another way if the gesture is different), and so on, including future types of devices not yet implemented. As another example, exemplified herein are different states of a user interface element such as focused and hovered, however other states such as selected, pressed, listening for audio or gesture input and so forth may exist with respect to a user interface element, and thus may be used by the technology described herein. Still further, simulated user input (e.g., virtual input) such as for testing purposes and the like may be used instead of or in addition to actual user input. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in computing, device input and user interface technology in general.

Figure 1:
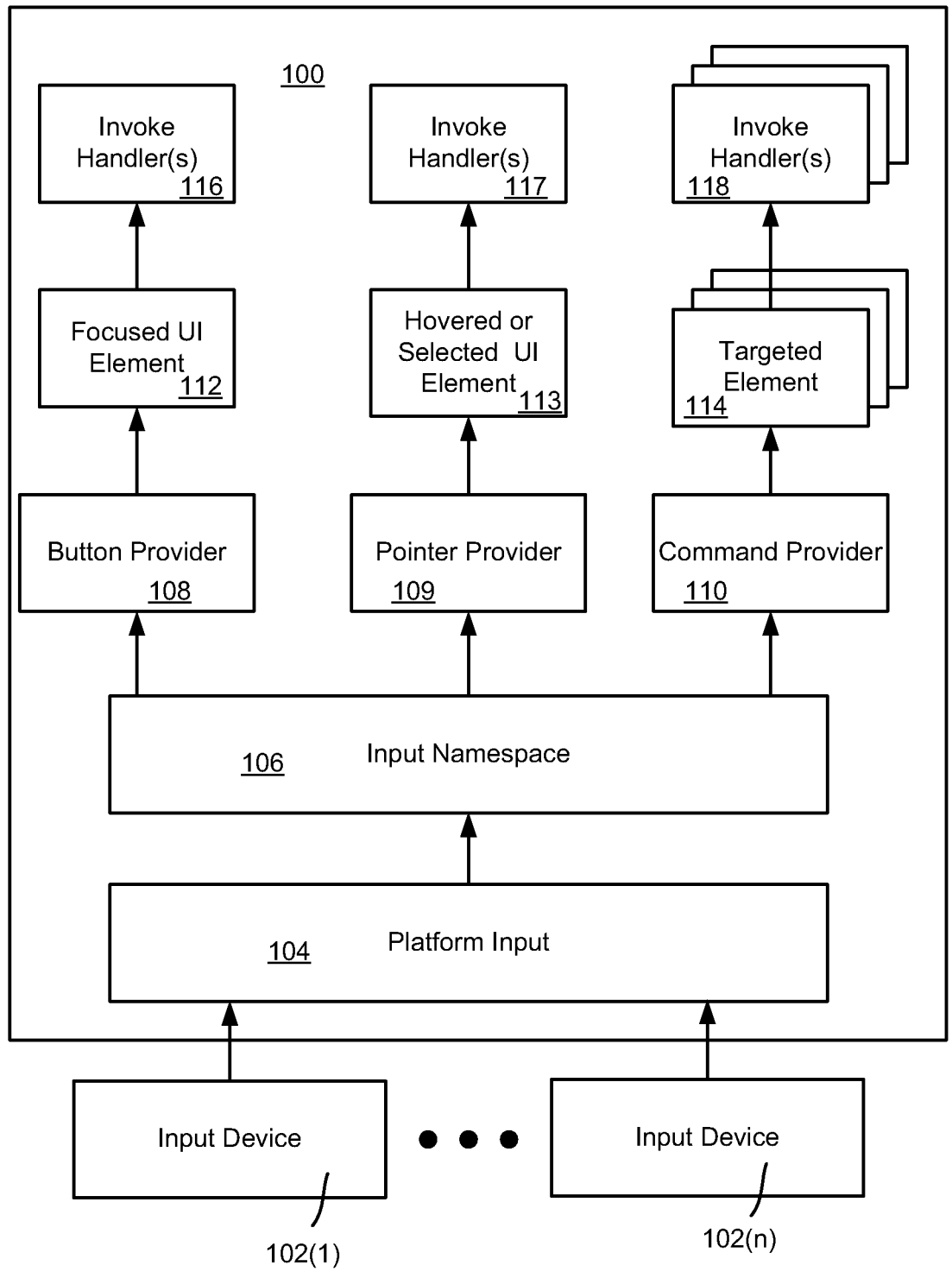
FIG. 1 is a block diagram showing an example configuration of components that may be used to unify input for invoke handling to match a user's invoke intent with respect to a user interface (UI) element or elements, according to one or more example implementations.

FIG. 1 is a block diagram showing various example components directed towards handling input and invoke in a unified way. In general, a computing machine/device 100 has one or more input devices 102(1)-102(n) coupled thereto to allow a user to interact with the computing machine/device 100. Depending on the type of computing machine/device 100, various non-limiting input devices include a physical and/or virtual keyboard, game controller, remote controller (e.g., for an interactive television), touch-screen, mouse or other pointer (including finger) input, gesture detection devices, speech detection devices and so on. As is understood, in a given scenario, not all such exemplified input devices are likely in use, and one or more other input devices may be present. Also note that an input device may be externally coupled to the computing machine/device 100, e.g., a remote controller or a camera, or internally coupled to (other components of) the computing machine/device 100, e.g., a touch-sensitive screen of a tablet device or smartphone, a built-in microphone and so on.

In general, the input is received at a given platform, and the platform may handle some of the platform input 104 at the platform level, e.g., to switch among application programs, perform platform-directed commands (shut off the computing device) and so on. In typical scenarios, however, much of the input is routed to an active (e.g., focused) application program or the like to allow user interaction with the application program's currently displayed user interface (UI) elements. Example program input includes sending input commands and/or data to a focused UI element, changing focus between UI elements, scrolling UI elements into and out of view, hovering a mouse pointer over different UI elements and so on.

As described herein, an input namespace component 106 may be used to map input from different input device sources to one of a limited number of providers, generally based upon the type of input. Three such providers are exemplified in FIG. 1, namely a button provider 108, a pointer provider 109 and a command provider 110. Note that the "providers" comprise an input normalization mechanism and corresponding logic, and thus may be part of a larger entity, e.g., a single object or the like may receive input and classify it as a button event, pointer event or command event and include logic for dealing with each type of event with respect to one or more UI elements.

With respect to unified input and invoke handling, it is desirable to be able to describe what happens when a piece of UI is invoked, independent of how it was invoked. This is useful for many reasons, including that the system can describe the invoke intent once, instead of many times, and allow an upstream input system to determine whether that invocation should occur, (e.g., factoring in platform-independent and platform-dependent input devices). This also normalizes input concepts to a limited number of (e.g., three) types, exemplified herein as Button, Pointer and Command types, despite differences among actual input devices. Among other benefits, this makes the input handling system extensible as new devices are invented or added to a platform. This further enables remapping of device types based on user intent, whereby, for example, a keyboard can act as a gamepad in a way that is transparent to the application program UI.

To accomplish unified input and invoke handling across devices and platforms, described herein is an input provider system for normalizing device input, in conjunction with a unified concept of invoke handlers to allow the declaration of invocation actions for the various types of input.

In one or more implementations, button provider input is routed to the single focused UI element 112, expecting that the element may have an appropriate button invoke handler, while command provider input is routed to all visible elements 114 that match a given command (not any off-screen elements). Pointer provider input targets the UI element currently under the pointer device's logical cursor, referred to herein as the hovered or selected UI element 113.

Note that UI elements are arranged in a UI tree, e.g., from a highest-level parent (e.g., a menu) to its children (e.g., sub-menus), which are parents to its own children (e.g., selectable items) and so on. When an invoke action does occur on a UI Element, the invoke action is performed by the corresponding invoke handler or handlers for each invoked UI element. In the event that the invoke is not handled by a UI element, e.g., because the element does not have a suitable invoke handler for the invoke event, the invoke bubbles up the UI tree, allowing its parent element in the ancestor chain to handle the event that was not handled lower in the tree. For example, with button provider input, the input bubbles up the focus train in the tree (e.g., the focus chain 344, FIG. 3) until handled.

Figure 2:
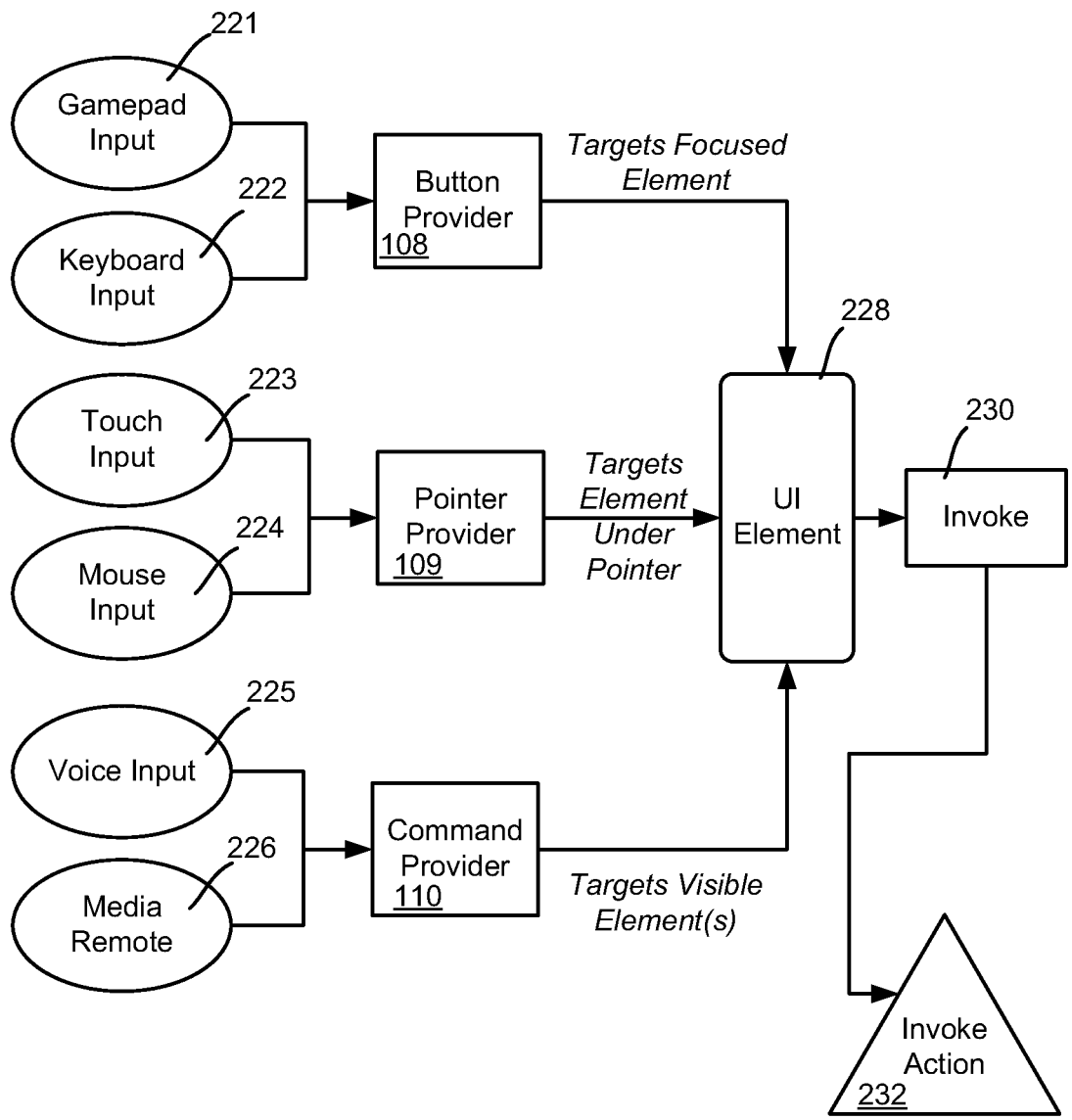
FIG. 2 is a representation of some example types of input devices normalized/classified into different types of providers, according to one or more example implementations.

A given UI element may have one or more invoke handlers associated with that element. An invoke handler 116-118 or may have properties including button, pointer, command text and invoke actions. As shown in FIG. 2, various example types of input 221-226 are associated with one (or more) of the providers 108-110 as described herein which provides events to a UI element 228 based upon the type of provider and various states of the UI element, e.g., focused, under the pointer, or targeted by a command.

For example, button is a property corresponding to the semantic button that triggers an invoke 230 associated with the UI element, as provided by a button provider 108 event. Alternatively, a pointer event may trigger the invoke 230 as provided by a pointer provider 109 event, or command text may be the semantic command text that triggers the invoke 230, as provided by a command provider 110 event. Invoke action 232 describes the action to take when the appropriate button, command, or pointer event fires on the UI element. Note that the system is flexible, such that different invoke handlers and/or actions may be used, which may be per UI element, and even per-button, per-pointer and per-command. For example, a button to a text entry element may have an invoke action that sends alphanumeric characters, cursor keys, backspace and delete keys to the text entry field, however an "Enter" character may take an entirely different action. A key combination such as Alt-W may trigger an invoke action for one UI element that is entirely different from the invoke action for another UI element, and so on.

The platform input 104 and input namespace 106 are responsible for providing low level input mechanisms to the platform. As an abstraction on top of various platforms' input, the input mechanisms are generalized to categories of input. For example keyboard, gamepad, and some media remote input is generally considered 'button' input that is processed by the button provider 108. Mouse, touch, stylus, and skeletal input are each generally considered 'pointer' input that is processed by the pointer provider 109. And voice input, certain keyboard (e.g., Ctrl+S), and some media remote commands are considered 'command' input that is processed by command button provider 110.

Each abstract category of input is considered an input provider, which adapts client input devices (e.g., keyboard 222) into an appropriate input provider (e.g., button provider 108). When multiple client input devices are available for the same input provider, the input provider may aggregate the input devices into a single facade. Similarly, some client input devices may span multiple input providers. For example, some advanced keyboards may be exposed via button provider and command provider, as certain keys correspond to commands rather than buttons.

The actual input device that was used is mostly internally processed by the appropriate input provider, but there are times where the application program may access this information. Although in many instances the application program code does not care about the specific input device, if the application program code does care, the invoke handlers are able to process the input provider event arguments to determine the specific source of input. For example, if desired, a game application program may differentiate between a keyboard and gamepad controller, even though both correspond to a button provider, such as to make game play be more consistent between devices (e.g., if one device makes possible faster user input than the other).

A general difference between input providers is based on how each type of input is intended to be used, how input events are organized/exposed, and what data each input event contains. The following are only some non-limiting examples, and not all need be used in a given implementation.

Figure 3:
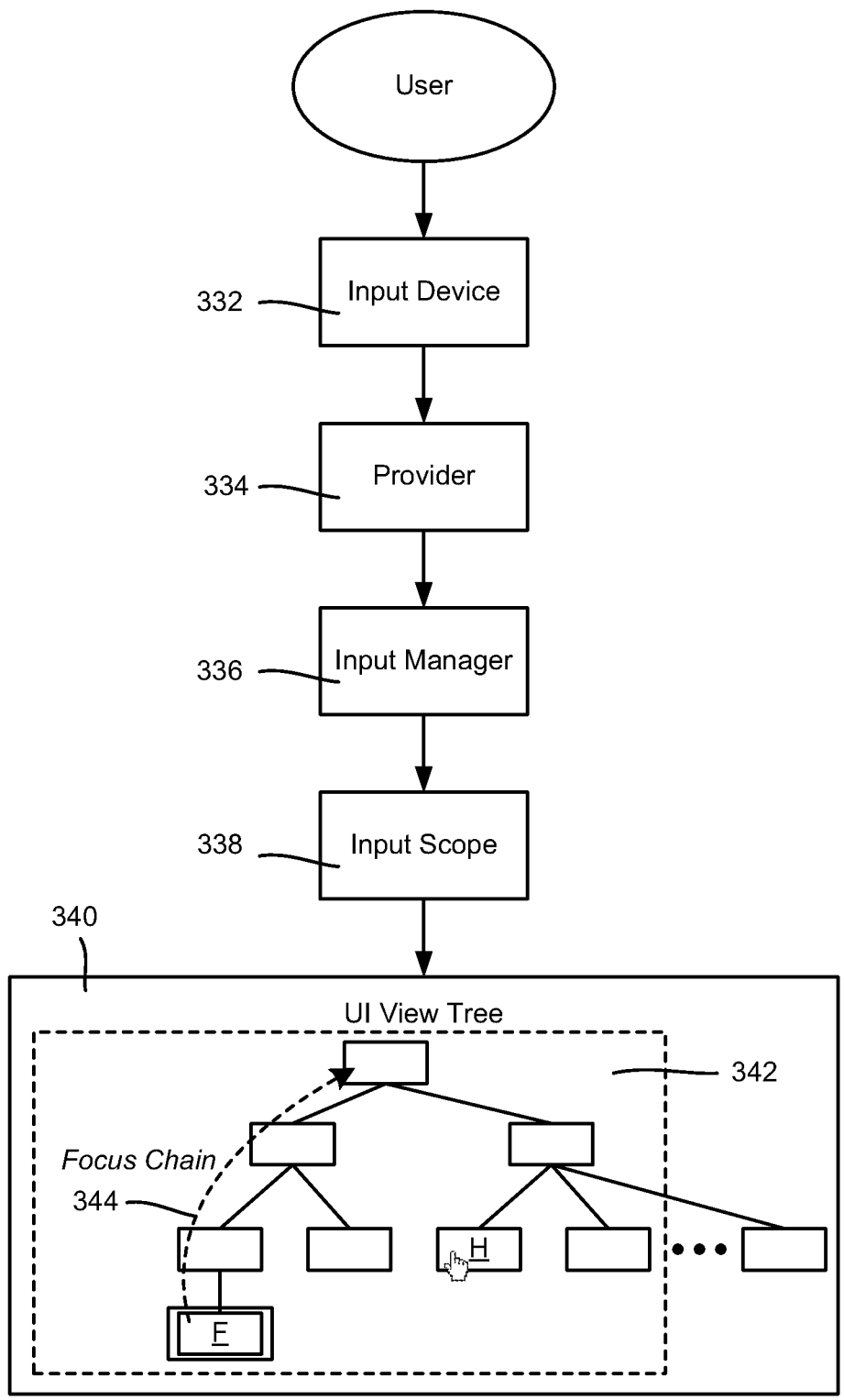
FIG. 3 is a block diagram showing example components that may be used to provide input to a UI element of a UI tree based upon input device type, and UI elements' states such as focused, under a pointer or visible or not visible, according to one or more example implementations.

In general, for a button provider, button input is intended to be directed to the UI element with focus. Note that the platform itself typically has no notion of which application program UI element has focus. Instead, as represented in FIG. 3, in one or more implementations, when a user 330 interacts with an input device 332 and thereby a corresponding provider 334, an input manager 336 in conjunction with an input scope 338, each of which may be object instances, track this focus information for an application program. This ensures that any button input is routed to the focused UI element, e.g., element F in the UI view tree 340. Similarly, the input manager 336 and/or input scope 338 may track which UI element is under the pointer (e.g., UI element H in the UI view tree 340) and which UI element or elements of the UI view tree 340 are currently visible, e.g., those in the dashed box 342.

Button events include 'Down' in which the event is fired when a button is pressed down. For analog buttons, Down is raised when the value transitions above some threshold (e.g., 0.9). Event arguments contain the abstract button code (e.g., in ASCII or Unicode, for example).

A button 'Up' event is raised when a pressed button is released. For analog buttons, UP is raised when the value transitions below some threshold (e.g., 0.1). Event arguments contain the abstract button code.

A button 'Change' event is raised when a button's value changes. For digital buttons, this happens before and after Down or Up, with value changes between 0 (up) to 1 (down). For analog buttons, this happens each time the analog value changes, between 0 (all the way up-not pressed) to 1 (all the way down). Event arguments contain the abstract button code and value for change button events.

For the pointer provider, pointer input is intended to be directed to the UI element 'under' the pointer (via hit-testing). Again, the platform itself typically has no notion of UI elements and/or hit testing, except, for example, when platform-based scrolling is being used.

Pointer input events include 'Engage' which is when a pointer becomes available/engaged (e.g., becomes active as an input device). Note that not all devices have the concept of Engage (enter)/or Disengage (exit), e.g., a mouse and touch do not, whereas a stylus and Kinect® do have Engaged and Disengaged states. A pointer input 'Disengage' event is when a pointer becomes unavailable/disengaged. Pointer Engage and Disengage input event arguments contain at least a pointer identifier (ID).

Pointer input events also include 'Down' which is when a pointer is in a "pressed" state or the like. For a Down event, the event arguments contain at least a pointer ID and location.

Another Pointer input event is Move' which is fired when a pointer is moved. Note that some devices can have a Move event before a Down, which is a 'hover move' event. Event arguments contain at least a pointer ID and location, and typically an isHover flag value.

A pointer input 'Up' event is raised when a (e.g., formerly pressed) pointer is released. Event arguments contain at least a pointer ID and location, and an isCancel flag value.

With respect to input corresponding to the command provider, command input is intended to be directed towards something on the screen, but not via focus or hit testing in one or more implementations. Command execution is a guided process that may contain a number of phases. Phases include waiting, in which the initial phase is waiting for the user to initiate commanding, and initiation.

The output of initiation comprises a list of command targets that has been filtered based on the known information (how the process of initiation began and/or the command). Note that at the time of initiation, a command may or may not yet be available.

By way of some examples, commanding can be initiated in various ways. For example, a user may say "Xbox" whereby there is no command available, or say "Xbox play" whereby a command is available, namely 'Play'. (Note that the "®" symbol was not included in the Xbox®-related commands above, because a user does not refer to such a symbol when speaking such commands.)

Another way that a command may be initiated is when the user presses and/or holds 'Ctrl' or 'Alt' on the keyboard. When such a button is pressed alone there is no command available; however, if a user presses 'Ctrl+S' such as to initiate a 'Save' command, there is a command available. Another command may occur via some direct interaction, e.g., if a user presses 'Play' on a media remote control device, the 'Play' command is directly available.

When initialization does not contain a command, (e.g., saying "Xbox" versus pressing 'Play'), the command provider goes into a targeting phase; (otherwise, this targeting phase is skipped). In the targeting phase, the user ordinarily sees some form of visualization that indicates which commands are available to execute. For example, when a user says "Xbox", movie tiles may go into a command target visual state in which their title is highlighted. This indicates to the user that the user can then speak a particular movie title (or show title) to execute that particular tile activation command. Another example is when a user presses 'Alt' in Microsoft® Word, and the ribbon shows tool tips, e.g., to indicate to the user that further hitting '5' will save the file.

Once the user specifies a command, the command target list is filtered. If the list length is greater than one, that is, more than one UI element still applies to the command, the process goes to disambiguation (described below). If instead the list length equals one, that is, one command applies, the process goes to execution (to execute the command, that is, In Execution, once a single command target has been identified, it is executed, and the process returns to the waiting phase). If the list length is zero, the process stays in targeting. At some point the targeting phase may be canceled, e.g., either explicitly (such as 'Esc' or 'cancel') or implicitly (via a time timeout).

When multiple command targets match the same command, the process enters the disambiguation phase. In this phase, the user ordinarily sees an alternative, non-ambiguous 'phrase' (on the ambiguous items) such as '1', '2', and so forth. Disambiguation acts similarly to targeting in other respects.

With respect to different types of input and providers, the following are only some non-limiting examples, and not all need be used in a given implementation. Keyboard input generally corresponds to the button provider, that is, most keyboard keys are exposed as button input. However some keyboard keys may correspond to the command provider, e.g., play, pause, mute and print screen are non-limiting examples of keyboard keys that may be exposed as commands.

Gamepad input generally corresponds to the button provider, and typically both digital and analog buttons/triggers are exposed as button input. Other button provider devices include Rockband® Guitar input and the like.

Mouse input, stylus input, touch input, Playstation® Move input and Playstation® Eye input are examples of input devices that generally correspond to the pointer provider. Voice input and media remote input generally correspond to the command provider.

Figure 4A:
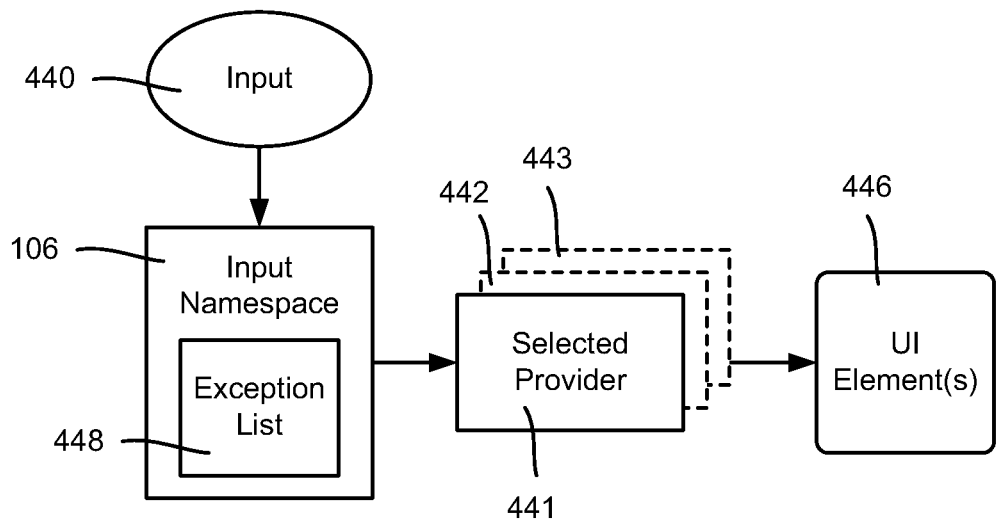
FIGS. 4A and 4B are block diagrams showing example components in alternative implementations for determining where to route input based at least in part upon input device type, according to one or more example implementations.
Figure 4B:
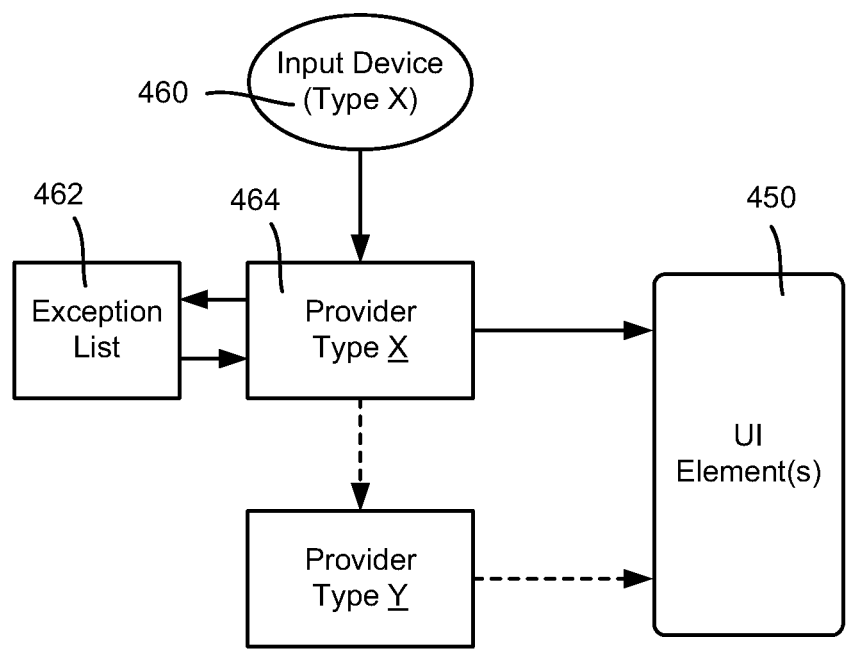

FIGS. 4A and 4B comprise example components that map input 440 from devices to a selected provider, e.g., from among providers 441-443 in this example, although it is understood that having three providers is not a requirement. The selected provider, e.g., 441, then provides the input to a UI element 446 to (possibly) take an invoke action.

In the example of FIG. 4A, the input namespace component 106 generally knows which types of input devices map to which provider by default. However, in FIG. 4A, the exemplified input namespace component 106 includes or is coupled to an exception list 448 that overrides default mappings. In this way, for example, a button may be converted to a command by routing the button input for certain buttons/key combinations to the command provider instead of the button provider.

FIG. 4B shows an alternative way this may be accomplished, in which input directed towards one or more UI elements 450 goes to one of the providers, e.g., provider A based upon the device type 460. The corresponding receiving provider 464 for some device of type X (e.g., for button-type devices) has an exception list 466 that the provider 464 uses to re-route certain input. For example, based upon the button code, a pause button received at the button provider may be recognized and converted to a command by rerouting the pause button to the command provider, e.g., the provider 468 for input devices of type Y. Each provider may have such an exception list. Having the exception list at the provider level may allow for different application programs to determine their own exceptions. Note that a system may be implemented in which both the input namespace 106 level and the provider level are able to recognize exceptions.

Figure 5:
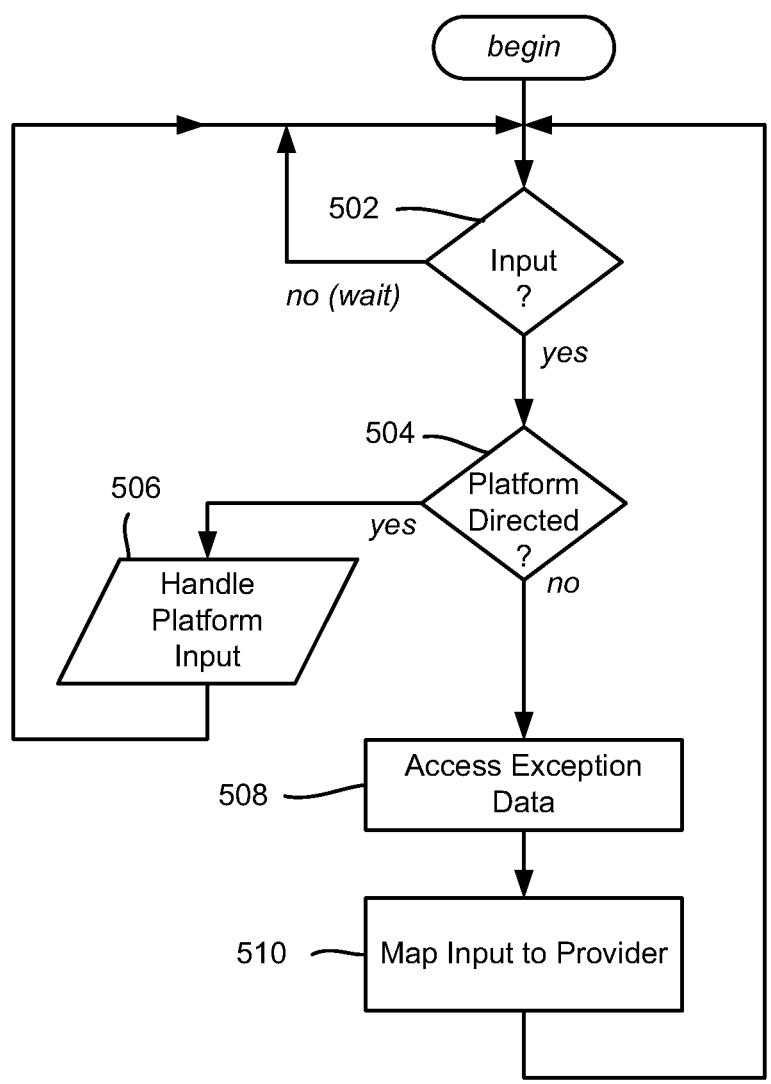
FIG. 5 is a flow diagram showing example steps that may be taken to process input, including in a unified way via provider selection, according to one or more example implementations.

FIG. 5 is a flow diagram summarizing some example steps related to input handling, beginning at step 502 where input to the system platform is processed when received; (note that step 502 shows a "waiting" loop for purposes of illustration, however input device input is typically event driven). Step 504 evaluates whether the input is directed to the platform, that is, rather than to the application program. As mentioned above, this may include platform input for switching the active application, platform level scrolling, and so on. If so, this is handled in any suitable (e.g., conventional) way as represented by step 506.

If directed to the application program, step 508 represents accessing any exception data, e.g., as described above with reference to FIG. 4A. Step 510 maps the input to the appropriate provider based upon the type of input device, subject to possible exceptions. Note that in an implementation as exemplified in FIG. 4B, the provider may re-map the input to a different provider.

Figure 6:
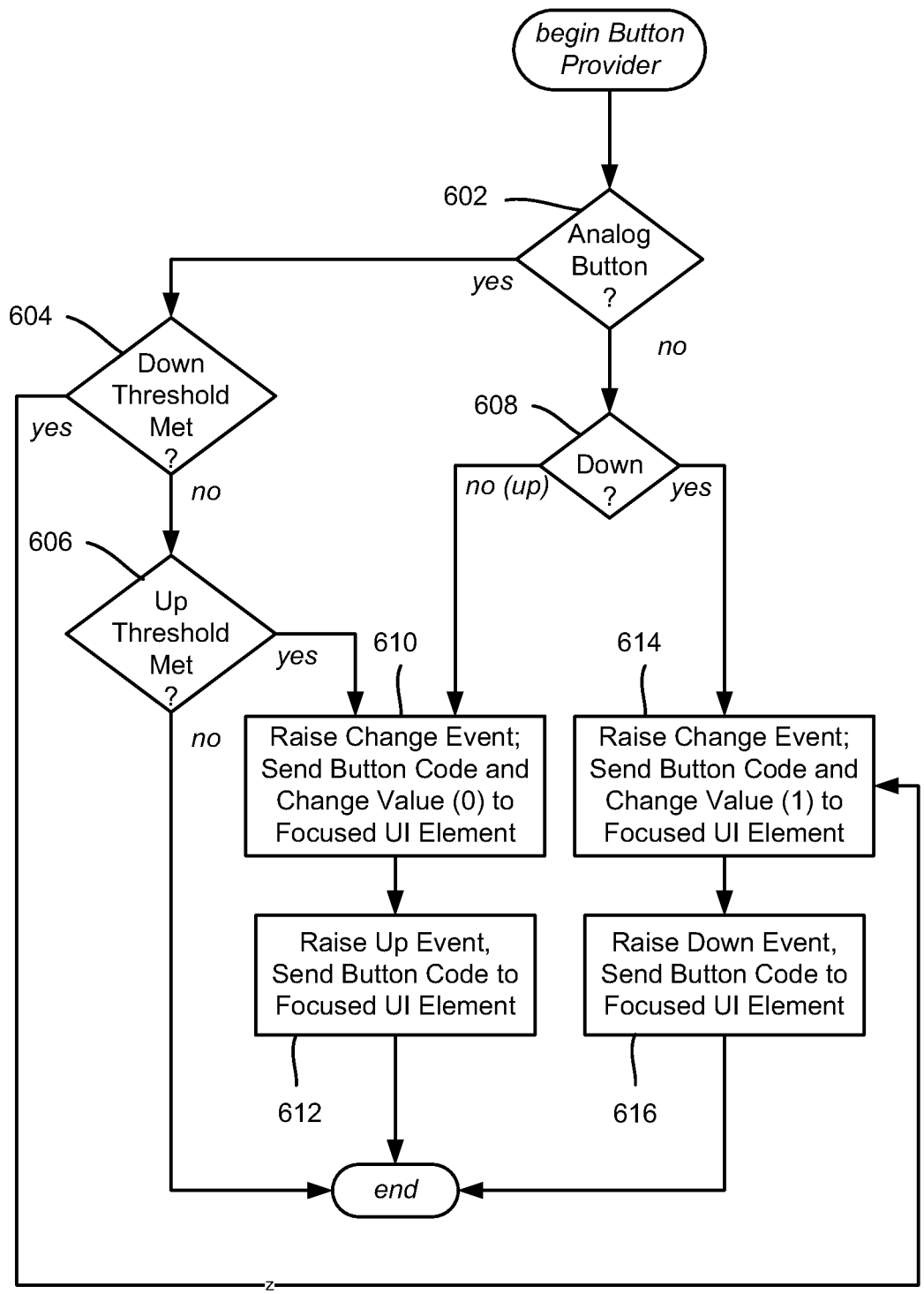
FIG. 6 is a flow diagram showing example steps that may be taken by a button provider to provide button event information to a focused UI element, according to one or more example implementations.

FIG. 6 shows example steps that may be taken by a button provider, beginning at step 602 where a distinction is made between analog button events and non-analog (binary up/down) buttons. Analog buttons are considered down based upon a down threshold evaluation (step 604) or up based upon an up threshold evaluation (step 606). If considered up, step 610 is executed, or if down, step 614 is executed, otherwise the button is not considered invoked. An application program may choose its own analog threshold values based upon data in the button provider or accessed by the button provider; such threshold values may vary during the running of the application program code, e.g., a game in one state may have relatively insensitive threshold values (e.g. down is above 0.9, up is below 0.1), and in another state may have relatively sensitive threshold values (e.g. down is above 0.6, up is below 0.4). Moreover, the threshold values may differ for different types of buttons.

For a binary button, step 608 evaluates whether the button is a down button and if so, branches to step 614. Otherwise the button is an up button event, handled via step 610. In general and as described above, change events are fired (to the focused UI element.) based upon the up event (step 610) or down event (step 614), followed by the button up event (step 612) or button down event (step 616), respectively.

Figure 7:
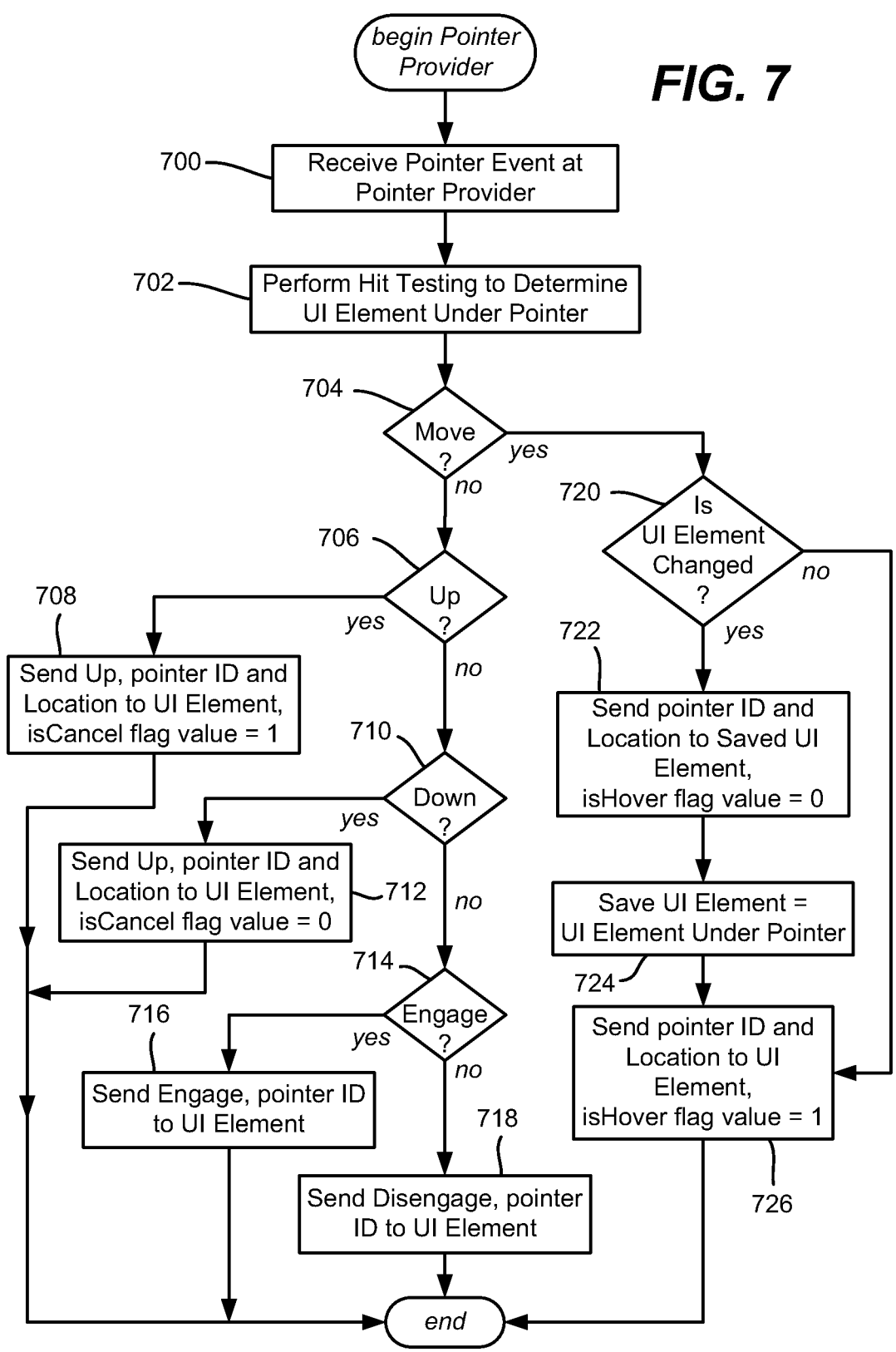
FIG. 7 is a flow diagram showing example steps that may be taken by a pointer provider to provide pointer event information to a UI element located under a pointer, according to one or more example implementations.

FIG. 7 shows example steps that may be taken by a pointer provider, beginning at steps 700 and 702 where hit testing is performed (step 702) based upon a pointer event received at the pointer provider (step 700). Note that hit testing may be performed elsewhere in the system, e.g., by the input manager and input scope, in which event step 702 accesses the hit testing information. In any event, the pointer provider knows the location of the pointer and what occurred, e.g., a move, up, down, engage or disengage event. Note that FIG. 7 only exemplifies these five states for purposes of illustrating one example implementation; other implementations may have other events, e.g., right mouse button down, right mouse button up, left mouse button down or left mouse button up may be separately handled in a straightforward way. Moreover, as is understood, the order of evaluating these events is arbitrary (although if an actual ordering is used, more frequent events such as move may be evaluated first, for example, for efficiency).

Step 704 evaluates whether the pointer event is a Move event, and if not, step 706 evaluates whether the pointer event is an Up event. If so, step 708 sends the Up event along with the pointer ID, location and, for example, the isCancel flag value of 1 to the UI Element under the pointer. Note that in general UI elements are rendered in Z-order with children rendered above their parent which is rendered above the parent's parent and so on, and thus as with hit testing, the targeted UI element is the lowest child having its area under the pointer; there is generally always at least some UI element in the application program's viewing area to receive the event. The UI element's invoke may take action with respect to the Up event, e.g., change focus to the invoked element, select an item for playback, select an item for text entry, and so on.

If not an up event, a down event is evaluated at step 710 and handled at step 712, which for example sends the Down event along with the pointer ID, location and, for example, the isCancel flag value of 0 to the UI Element under the pointer. The UI element's invoke may take action with respect to the Down event, e.g., allow dragging of a UI element while holding the pointer down. There may not be an action taken, e.g., a UI element may need a Down event followed by an Up event to take an invoke action.

If neither a Move, Up or Down event, then in this example the event is either an engage event (steps 714 and 716) or a disengage event (step 718), which each send their respective event and the pointer ID to the UI element under the pointer.

Returning to step 704, pointer devices may move the pointer without the pointer being up or down, e.g., a mouse may move the pointer around the application program's visible area, in which event the pointer hovers over some UI element of that application program. Step 704 detects this move event, and step 720 determines if the move event changed the UI element underneath the pointer. If not, then nothing need be changed, although step 726 may be executed to inform the UI element of the new pointer location, so that, for example, the UI element may change itself in some way, (e.g., the element may change its appearance one way if hovering near the center of the UI element versus a different appearance if hovering away from the center of the UI element).

If the Move event changes the underlying UI element, step 722 sends the pointer ID and (optionally) the location to the previously hovered UI element (its identity was saved during the last Move event) along with the isHover flag value=0 so that the previously hovered UI element knows that it is no longer underneath the pointer, e.g., so it can change its appearance in some way if desired to indicate the non-hovered state. Step 724 changes the saved UI element ID to that of the newly hovered UI element, and step 726 notifies the new UI element of the Move event, the location data and the isHover flag value=1 so that the new UI element knows it is being hovered over. The hovered over UI element may not change its appearance or other characteristics to reflect this state, e.g., a parent menu container may not change its appearance but a child item element of that menu container may change its appearance.

Figure 8:
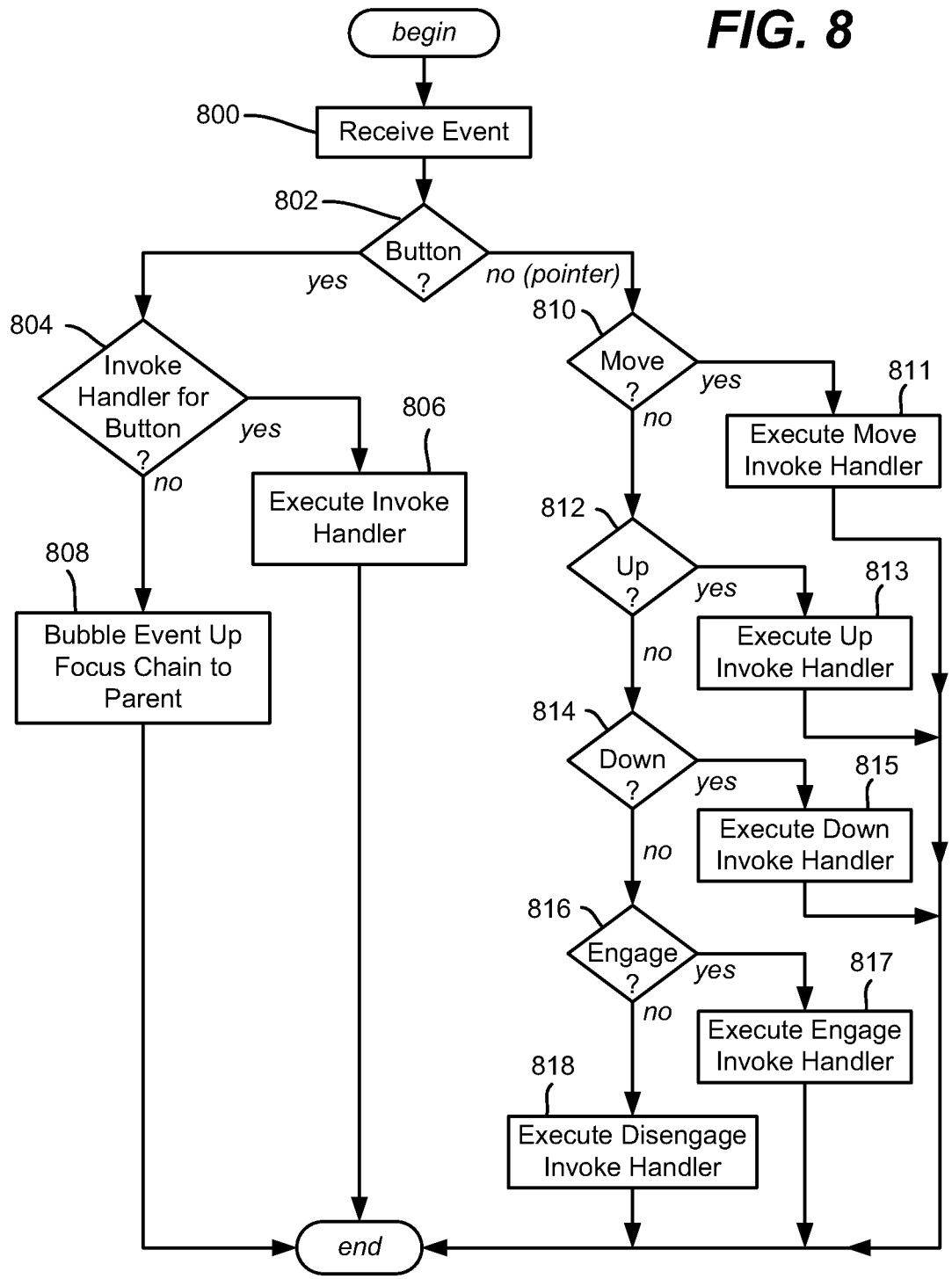
FIG. 8 is a flow diagram showing example steps that may be taken by a UI element to process button or pointer input events, according to one or more example implementations.
Figure 9:
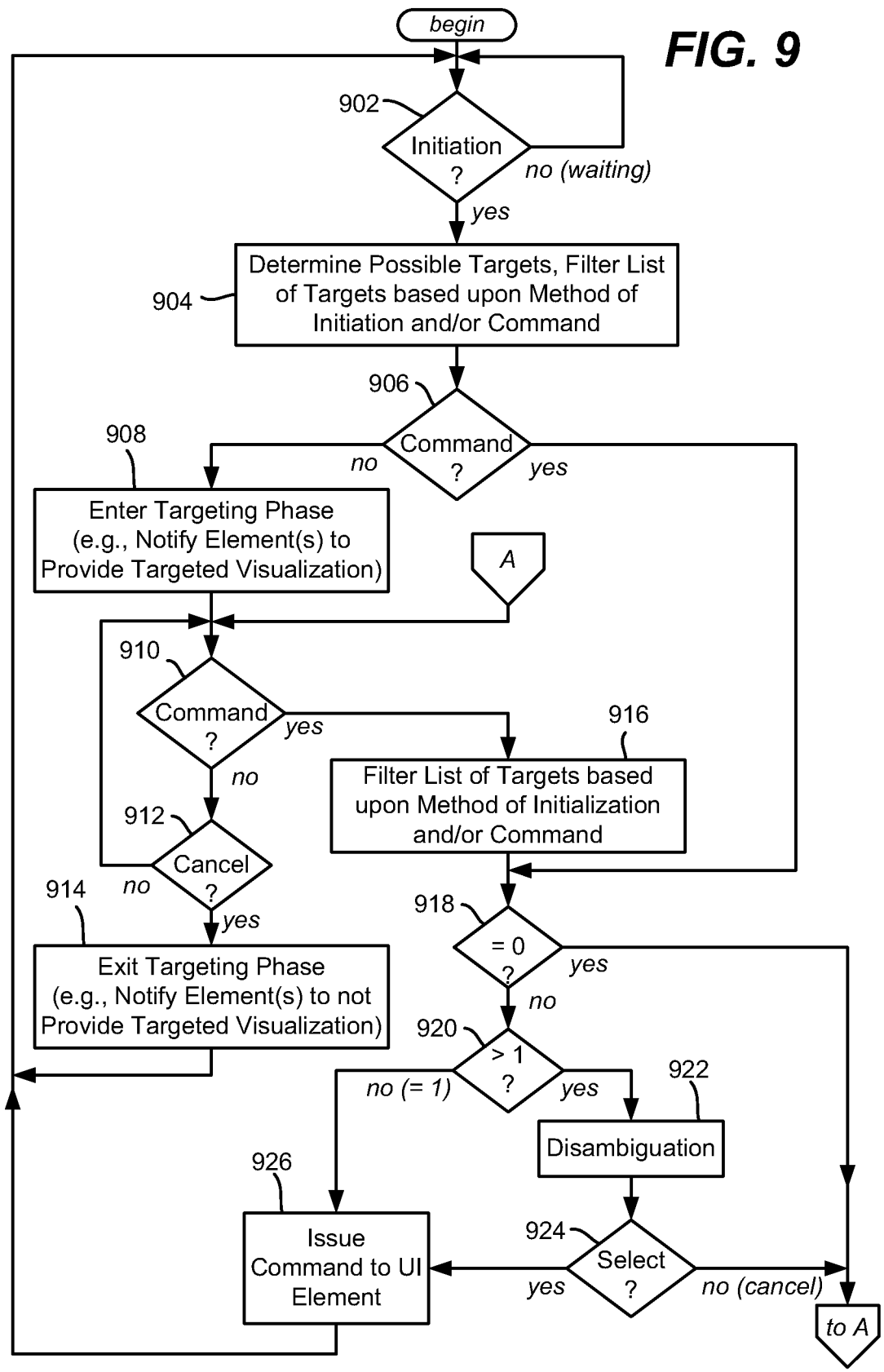
FIG. 9 is a flow diagram showing example steps that may be taken by a command provider to provide command-related data to a selected UI element of a set of one or more UI candidate element or elements, according to one or more example implementations.
Figure 10:
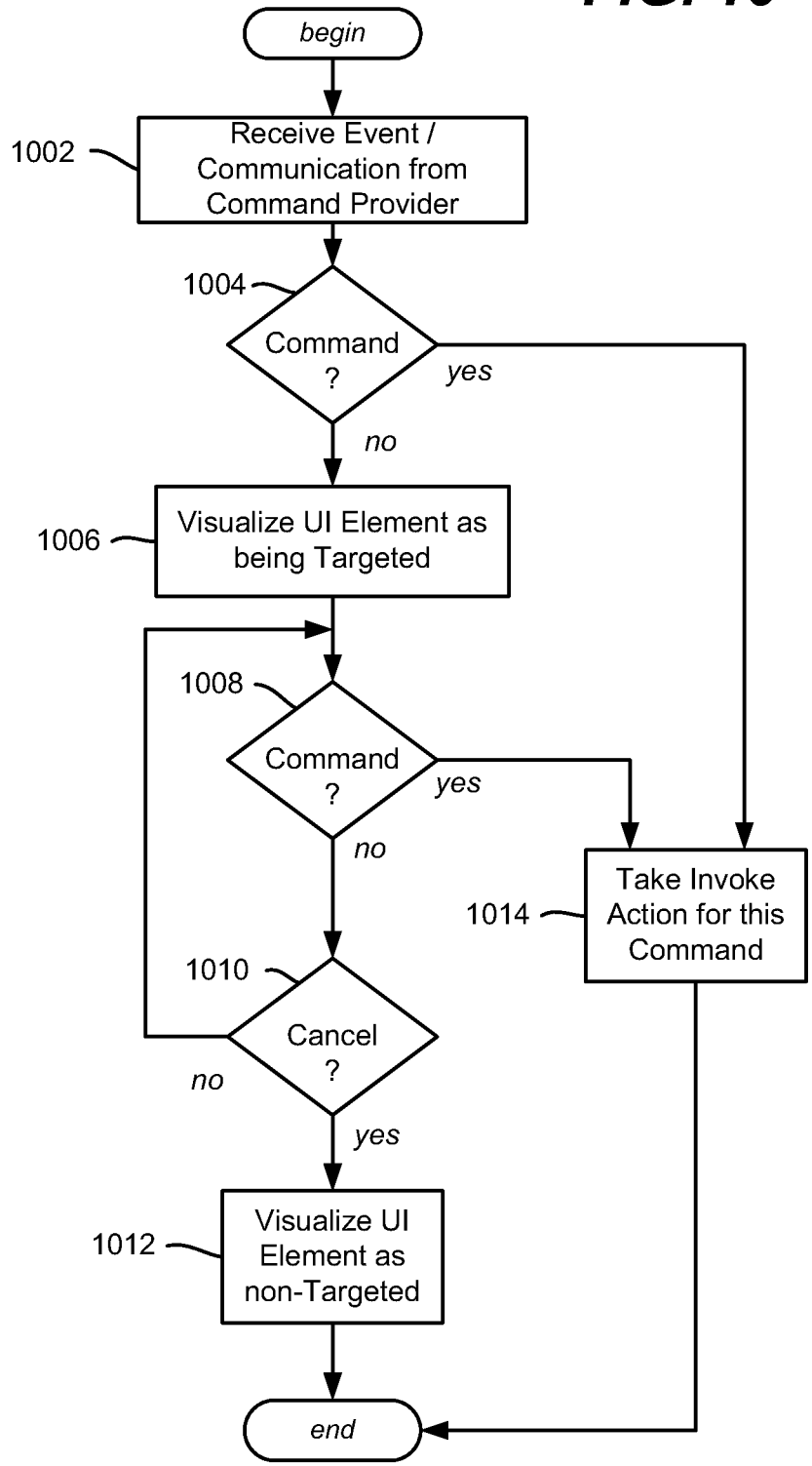
FIG. 10 is a flow diagram showing example steps that may be taken by a UI element to communicate with a command provider and process command-related data, according to one or more example implementations.

FIG. 8 summarizes example steps that may be taken by a UI element upon receiving button or pointer input from a button provider or pointer provider, respectively, as represented by step 800; (note that FIGS. 9 and 10 are directed towards handling command input, which may be directed towards multiple UI elements). Step 802 evaluates whether the input is from the button provider, and if so, branches to step 804 to determine if the UI element has an invoke handler for this button. If so, step 806 executes the invoke handler to take the invoke action specified therein. If not, the button event is bubbled up the focus chain (e.g., 344, FIG. 3) to the UI element's parent; note that at least the highest level parent may take an invoke action, which may simply be to ignore the button event.

If instead the event is a pointer event, step 802 branches towards steps 810-818. Steps 810 and 811 are for handling move events, steps 812 and 813 are for handling up events, steps 814 and 815 are for handling down events, steps 816 and 817 for engage events, and step 818 for disengage events. Again, the order of handling such events is arbitrary (although it is feasible that the ordering can impact efficiency). As represented in FIG. 8, each such event may have a separate invoke handler; however, as can be readily appreciated, an alternative implementation may have as little as a single invoke handler that internally differentiates among the different types of pointer events to take an appropriate action for each type. Further, although not shown in FIG. 8, it is feasible to have not have a specified pointer event handler for a given pointer event, in which situation the pointer event may bubble up to the parent (similar to non-handled button events).

FIG. 9 summarizes example steps of the command provider, and FIG. 10 example steps of a UI element that receives input (or other communications) from the command provider. Step 902 represents the waiting phase, until the user initiates commanding.

Step 904 determines the set of candidate target UI elements, e.g., those visible on the screen. Note however that new UI elements also may be placed on screen when entering the initiation phase, e.g., if the user hits the "Alt" key then the ribbon shows tool tips that were not previously visible. This set may be filtered into a subset of zero, one or more targets based upon the process of entering initiation (e.g., spoken, key press, gesture and so on) and/or based upon any accompanying command. For example, the "Play" command may apply only to one or more currently visible UI elements representing some media that can be played, and not to UI elements such as a parent item container, "Back" button and so forth.

Step 906 evaluates whether the user entered the initiation phase with an associated command. If not, at step 908 the command provider enters the targeting phase. In the targeting phase, the user ordinarily sees some form of targeting-related visualization that indicates which commands/UI elements are available to receive a command to execute. Thus, step 908 provides the UI elements with an opportunity to render themselves in a certain way; e.g., movie tiles may go into a command target visual state in which their title is highlighted. Step 910 then represents waiting for a command in the targeting phase; if received, the command target list (again, for example) may be filtered at step 916 based upon the received command.

At some point the targeting phase instead may be canceled, e.g., either explicitly (such as 'Esc' or 'cancel') or implicitly (via a time timeout). This is represented via step 912. If canceled, the UI elements that were targeted may be notified to no longer provide the targeting-related visualization that indicated that those elements are element(s) targeted for a command.

If the command target list length is greater than zero as evaluated at step 918, the process stays in targeting. If instead the list has more than one UI element that still applies to the command, as evaluated at step 920, the process goes to disambiguation at step 922, e.g. to select (step 924) a single UI element for the command; this may include notifying any UI elements subject to disambiguation to change their appearance or the like. Note that the user may choose to not select an element during disambiguation, (e.g., the user cancels or the disambiguation phase times out), in which event the process may return to the targeting phase, or alternatively, to the waiting phase, possibly notifying any relevant UI elements to change their appearance or the like.

If instead the list length equals one, that is, the command applies to one UI element, the process goes to execution at step 926, e.g., the command is sent to the UI element for its command invoke handler to handle via an invoke action.

FIG. 10 shows example steps related to a UI element's interaction with the command provider, beginning at step 1002 where the command event or some other related communication is received. If the communication is a command event, the UI element invokes an action related to the command at step 1014; (again, possibly bubbling up the command if no invoke handler relates to this command).

If not a command, the communication may be to notify the UI element that the UI element is part of the targeting phase of the command provider, whereby at step 1006 the UI element may visualize itself in some new way to indicate it is being targeted. Once targeted, the UI element waits for a command event or a cancel communication. If a command is received, the UI element process branches to step 1014 to handle the command as described herein, e.g., via a suitable invoke handler. Alternatively, the communication may be a cancel, whereby the UI element may visualize itself in some other way to indicate it is no longer being targeted.

As can be seen, the technology described herein has a way of handling the invoke intent of a user in a unified way that abstracts the actual input device from the type of input device so that UI elements may consistently process input based upon the type of input. The technology allows for describing what happens when a piece of UI is invoked, independent of how it was invoked. To this end, input may be normalized into different types of input based upon the user invoke intent, to select a corresponding provider for each type of input. Invoke actions may be performed based upon the provider selected for the input and the associated input data. Example providers include button, pointer and command providers.

One or more aspects are directed towards processing input from an input device, including selecting a selected provider of a set of two or more providers based at least in part on a type of the input device, and routing the input to the selected provider. Further described herein is communicating input-related data from the selected provider to one or more UI elements, including providing an input event to a selected UI element, and taking an invoke action at a selected UI element of the one or more UI elements based upon the input event.

The input may correspond to button input; selecting the selected provider may comprise selecting a button provider, and providing the input event to the selected UI element may comprise communicating a button input event and data associated with the input event including a button code to the selected UI element based upon the selected UI element having focus.

The input may correspond to pointer input; selecting the selected provider may comprise selecting a pointer provider, and providing the input event to a selected UI element may comprise communicating a pointer input event and data associated with the pointer input event to the selected UI element based upon a rendered representation of the UI element at a location on a display screen that is below a current pointer location. Pointer input may be a move input event of a pointer, and providing the input event to the selected UI element may comprise communicating data associated with the pointer input move input event that indicates that the selected UI element is being hovered over by the pointer. Alternatively, communicating data associated with the pointer input move input event may indicate that a selected UI element is no longer being hovered over by the pointer.

The input may corresponds to a pointer up input event including information indicating that the pointer is in an up state with respect to the UI element. The input may corresponds to a pointer down input event including information indicating that the pointer is in a down state with respect to the UI element. The input may correspond to a pointer engage or disengage input event of a pointer device, with information communicated to the UI element indicating that the pointer device is in an engaged or disengaged state, respectively.

The input may correspond to command input; selecting the selected provider may comprise selecting a command provider, and providing the input event to the selected UI element may comprise filtering to obtain a set of one or more candidate UI elements based upon initialization and/or command information. If the set contains one candidate, the one candidate is the selected UI element for providing the input event including command data to the selected UI element. If the set contains more than one candidate, described herein is disambiguating to select one candidate from the set as the selected UI element for providing the input event including command data to the selected UI element.

The command input may be a command initiation request without an accompanying command. If so, a targeting phase may be entered, including visualizing one or more UI elements to which a subsequent received command is able to be targeted as the selected UI element.

One or more aspects are directed towards an input set comprising one or more input devices, a provider set comprising at least two input providers and a user interface (UI)

element set comprising one or more UI elements, in which at least one UI element is coupled to an invoke handler that takes an invoke action when executed. An input namespace component is coupled to the input set to receive input therefrom, and to route the input to a selected input provider of the provider set based at least in part upon a type of the input device. The selected provider is configured to communicate data corresponding to the input to a selected UI element of the UI element set, and the selected UI element is configured to execute an invoke handler to take an invoke action based upon the input.

The provider set may include a button provider. The input namespace component may routes at least some input from a physical keyboard input device, a virtual keyboard input device, a gamepad controller input device or a media remote control input device to the button provider. Data comprising a button event and button code representative of which button was pressed is communicated by the button provider to the selected UI element.

The provider set may include a pointer provider, and the input namespace component may route at least some input from a pointer input device, touch input device, stylus input device, or skeletal input device to the pointer provider. The pointer provider may communicate the data to a selected UI element based upon a current pointer location relative to a location of a rendered representation of the selected UI element.

The provider set may include a command provider. The input namespace component may route at least some input from a speech input device, physical keyboard input device, or virtual keyboard input device to the command provider. The command provider communicates data to the selected UI element based upon an initiation process and/or a command.

One or more aspects are directed towards receiving input from an input device, and normalizing the input based at least in part on a type of the input device. For input normalized as button input from a button type input device, described herein is sending a button event to a focused user interface (UI) element. For input normalized as pointer input from a pointer type input device, described herein is sending a pointer event to a selected UI element, including selecting the selected UI element based upon an onscreen location of a representation of the UI element relative to a current onscreen pointer location.

A button event may be received at the focused UI element, and used to perform an invoke action associated with the button event. A pointer event may be received at a pointed-to or hovered over UI element (as the selected UI element), and used to perform an invoke action associated with the pointer event.

For input normalized as command input from a command type input device, command input data may be sent to a selected UI element, including filtering UI elements to obtain a candidate set of one or more candidate UI elements based upon initialization and/or command information, and selecting a candidate UI element as the selected UI element from the candidate set. Selecting the candidate UI element as the selected UI element may comprise targeting the candidate set, receiving user input related to a command, and a) if the command applies to only one targeted candidate, selecting the one targeted candidate as the selected candidate, or b) if the command applies more than one targeted candidate, disambiguating between the targeted candidates, including receiving user selection information to select one of the targeted candidates as the selected UI element. The command input data may be received at the selected UI element, to perform an invoke action associated with the command input data.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
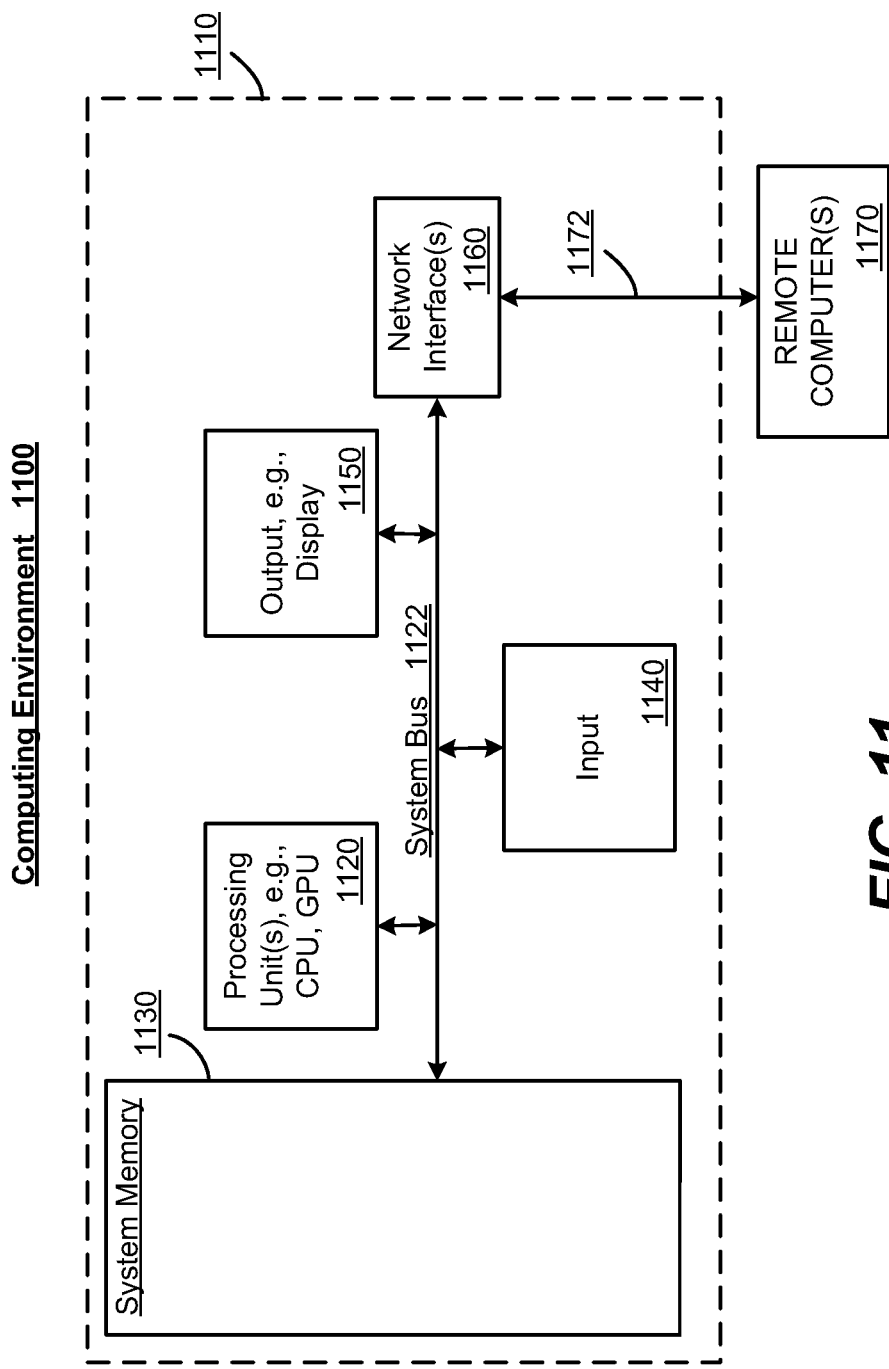
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
receiving, by a system comprising a processor, input from an input device;
routing, by the system, the input to a provider corresponding to the input device based on mappings of input devices to providers, wherein at least two input devices of the input devices are mapped to a single provider of the providers, and at least two providers of the providers are mapped to different input devices of the input devices, wherein respective providers of the providers are configured to normalize inputs from the input devices mapped to the respective providers;

normalizing, by the system via the provider, the input to generate a normalized input event, wherein the provider is a command provider, and the normalizing comprises:

filtering to obtain a set of one or more candidate user interface (UI) elements based upon at least one of initialization or command information, and if the set contains one candidate, selecting the one candidate as the selected UI element for providing the input event including command data to the UI element, and if the set contains more than one candidate, disambiguating to select one candidate from the set as the UI element for providing the normalized input event to the UI element; and performing, by the system, an invoke action at a UI element based upon the normalized input event.

2. The method of claim 1, further comprising communicating, by the system, the normalized input event from the provider to the UI element.

3. The method of claim 1, wherein in response to another input being associated with another provider that is a button provider, and another normalized input event being a button input event, communicating, by the system, a button code to the UI element based upon the UI element having focus.

4. The method of claim 1, wherein in response to another input being associated with another provider that is a pointer provider, and another normalized input event being a pointer input event, communicating, by the system, data associated with the pointer input event to the UI element based upon a rendered representation of the UI element at a location on a display screen that is below a current pointer location.

5. The method of claim 4, wherein the communicating the data comprises communicating data associated with a pointer input move input event that indicates that the UI element is being hovered over by the pointer.

6. The method of claim 4, wherein the communicating the data comprises communicating data associated with a pointer input move input event that indicates that the UI element is no longer being hovered over by the pointer.

7. A system comprising:
a processor; and
a memory communicatively coupled to the processor, the memory having stored therein computer-executable instructions, comprising:
a user interface (UI) element set comprising one or more UI elements, at least one UI element coupled to an invoke handler that takes an invoke action when executed;
an input namespace component configured to:
receive input from an input device, and
route the input to a provider corresponding to the input device based on mappings of input devices to providers, wherein at least two input devices of the input devices are mapped to a single provider of the providers, and at least two providers of the providers are mapped to different input devices of the input devices, wherein respective providers of the providers are configured to normalize inputs from the input devices mapped to the respective providers; and the provider configured to:
normalize the input to generate a normalized input event, wherein the provider is a command provider, and the normalizing comprises:
filter to obtain a set of one or more candidate UI elements based upon at least one of initialization or command information, and if the set contains one candidate, select the one candidate as the selected UI element for providing the input event including command data to the UI element, and if the set contains more than one candidate, disambiguate to select one candidate from the set as the UI element for providing the normalized input event to the UI element, and
communicate the normalized input event to a UI element of the UI element set, the UI element configured to execute the invoke handler to take the invoke action based upon the normalized input event.

8. The system of claim 7, wherein the providers comprise a button provider, a pointer provider, and the command provider.

9. The system of claim 7, wherein the input devices comprise at least one of a physical keyboard input device, a virtual keyboard input device, a gamepad controller input device or a media remote control input device that are mapped to a button provider of the providers, and wherein in response to another input being associated with another provider being the button provider and another normalized input event comprises a button event communicate the other normalized input event comprising a button code representative of which button was pressed.

10. The system of claim 7, wherein the input devices comprise at least one of a pointer input device, touch input device, stylus input device, or skeletal input device that are mapped to a pointer provider of the providers, and wherein in response to another input being associated with another provider being the pointer provider communicate another normalized input event to the UI element based upon a current pointer location relative to a location of a rendered representation of the UI element.

11. The system of claim 10, wherein the other normalized input event comprises data indicating that the UI element is being hovered over by the pointer.

12. The system of claim 7, wherein the input devices comprise at least one of a speech input device, physical keyboard input device, or virtual keyboard input device that are mapped to the command provider of the providers.

13. A non-transitory computer-readable medium having instructions stored thereon that, in response to execution, cause a system including a processor to perform operations comprising:
routing a received input from an input device to a provider corresponding to the received input selected based on mappings of input devices to providers, wherein at least two input devices of the input devices are mapped to a single provider of the providers, and at least two providers of the providers are mapped to different input devices of the input devices, wherein respective providers of the providers are configured to normalize inputs from the input devices mapped to the respective providers;
normalizing, via the provider, the input to generate a normalized input event, wherein the provider is a command provider, and the normalizing comprises:
filtering to obtain a set of one or more candidate user interface (UI) elements based upon at least one of initialization or command information, and if the set contains one candidate, selecting the one candidate as the selected UI element for providing the input event including command data to the UI element, and if the set contains more than one candidate, disambiguating to select one candidate from the set as the UI element for providing the normalized input event to the UI element; and performing an invoke action at a UI element based upon the normalized input event.

14. The non-transitory computer-readable medium of claim 13, the operations further comprising communicating the normalized input event from the provider to the UI element.

15. The non-transitory computer-readable medium of claim 13, wherein in response to another input being associated with another provider that is a button provider, and another normalized input event being a button input event, communicating a button code to the UI element based upon the UI element having focus.

16. The non-transitory computer-readable medium of claim 13, wherein in response to another input being associated with another provider that is a pointer provider, and the normalized input event being a pointer input event, communicating data associated with the pointer input event to the UI element based upon a rendered representation of the UI element at a location on a display screen that is below a current pointer location.

17. The non-transitory computer-readable medium of claim 16, wherein the communicating the data comprises communicating data associated with a pointer input move input event that indicates that the UI element is being hovered over by the pointer.

18. The non-transitory computer-readable medium of claim 16, wherein the communicating the data comprises communicating data associated with a pointer input move input event that indicates that the UI element is no longer being hovered over by the pointer.

19. The non-transitory computer-readable medium of claim 13, wherein the input devices comprise at least one of a physical keyboard input device, a virtual keyboard input device, a gamepad controller input device or a media remote control input device that are mapped to a button provider of the providers.

20. The non-transitory computer-readable medium of claim 13, wherein the input devices comprise at least one of a speech input device, physical keyboard input device, or virtual keyboard input device that are mapped to the command provider of the providers.

* * * * *